United States Patent
Sarkar et al.

(10) Patent No.: US 6,842,624 B2
(45) Date of Patent: Jan. 11, 2005

(54) SYSTEMS AND TECHNIQUES FOR POWER CONTROL

(75) Inventors: Sandip Sarkar, San Diego, CA (US); Tao Chen, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 188 days.

(21) Appl. No.: 09/942,502

(22) Filed: Aug. 29, 2001

(65) Prior Publication Data

US 2003/0045319 A1 Mar. 6, 2003

(51) Int. Cl.$^7$ .............................................. H04B 07/00
(52) U.S. Cl. ...................... 455/522; 455/69; 455/67.1
(58) Field of Search .......................... 455/522, 69, 67.1, 455/67.11–67.17, 343.1–343.6, 574; 370/342, 347, 337

(56) References Cited

U.S. PATENT DOCUMENTS 6,028,884 A  2/2000  Silberger et al.
6,590,874 B1 *  7/2003  Wang et al. ............ 455/522 X

FOREIGN PATENT DOCUMENTS

| EP | 1069704 A1 | 1/2001 |
| EP | 1089456 A2 | 4/2001 |
| WO | 9953701 | 10/1999 |
| WO | 0048335 | 8/2000 |

OTHER PUBLICATIONS

"Universal Mobile Telecommunications System (UMTS); Physical layer porcedures (FDD) (3GPP TS 25.214 version 3.4.0 Release 1999)", 3GPP ETSI TS 125 214 v3.4.0, Sep. 2000, pp. 1–47.

* cited by examiner

Primary Examiner—Nay Maung
Assistant Examiner—Philip J. Sobutka
(74) Attorney, Agent, or Firm—Philip R. Wadsworth; Thien T. Nguyen; Erin P. Madill (57) ABSTRACT

Systems and techniques for power control include receiving a transmission having a channel with active portion and a silent portion, and controlling power of the received transmission as a function of a parameter of the active portion of the channel during a first time period and independent of the parameter during a second time period.

68 Claims, 4 Drawing Sheets

SYSTEMS AND TECHNIQUES FOR POWER CONTROL

FIELD

The present invention relates to communications systems, and more specifically, to systems and techniques for controlling transmission power in a wireless communications system.

BACKGROUND

Modem communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a unique code. In multi-access communications systems, techniques to reduce mutual interference between multiple users are often utilized to increase user capacity. By way of example, power control techniques can be employed to limit the transmission power of each user to that necessary to achieve a desired quality of service. This approach ensures that each user transmits only the minimum power necessary, but no higher, thereby making the smallest possible contribution to the total noise seen by other users. The desired quality of service is based on one or more quality parameters of the voice or data transmissions. However, when voice and data transmissions are not present, it is desirable to optimize the transmission power of each user in other ways. This optimization of the transmission power should be done in a way that does not degrade the quality of service when voice or data transmissions reoccur.

SUMMARY

In one aspect of the present invention, a method of power control includes receiving a transmission having a channel with an active portion and a silent portion, and controlling power of the received transmission as a function of a parameter of the active portion of the channel during a first time period and independent of the parameter during a second time period.

In another aspect of the present invention, an apparatus configured to receive a transmission having a channel with an active portion and a silent portion includes a processor configured to estimate a parameter of the active portion of the channel, and generate a power command as a function of the estimated parameter during a first time period and independent of the estimated parameter during a second time period.

In yet another aspect of the present invention, an apparatus configured to receive a transmission having a channel with an active portion and a silent portion includes parameter estimation means for estimating a parameter of the active portion of the channel, and power command generator means for generating a power command as a function of the estimated parameter during a first time period and independent of the estimated parameter during a second time period.

In a further aspect of the present invention, computer readable media embodying a method of power control of a received transmission having an active portion and a silent portion, controls power of the received transmission as a function of a parameter of the active portion of the channel during a first time period and independent of the parameter during a second time period In yet a further aspect of the present invention, an apparatus includes a transmitter configured to transmit first and second channels, the first channel having an active portion and a silent portion, and a power control unit configured to maintain a power ratio between the first channel to the second channel during the silent period, adjust the power ratio in response to a transition from the silent portion of the channel to the active portion of the channel, and readjust the power ratio at a predetermined time after the transition. In another aspect of the present invention, an apparatus includes means for transmitting first and second channels, the first channel having an active portion and a silent portion, means for maintaining a power ratio between the first channel and the second channel during the silent period, adjusting means for adjusting the power ratio in response to a transition from the silent portion of the channel to the active portion of the channel, and readjusting means for readjusting the power ratio at a predetermined time after the transition.

It is understood that other aspects of the present invention will become readily apparent to those skilled in the art from the following detailed description, wherein is shown and described only exemplary embodiments of the invention, simply by way of illustration. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

Aspects of the present invention are illustrated by way of example, and not by way of limitation, in the accompanying drawings in which like reference numerals refer to similar elements.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

In an exemplary communications system, a communications device can access a network, or communicate with other devices. The network can be a packet based network, such as the Internet or a corporate Intranet, a public switched telephone network (PSTN), or any other suitable network. An access network can be used to provide a wireless interface between the communications device and the network. An access network may take on various forms including, by way of example, one or more base stations in communication with a base station controller. The exemplary communications system can support various communications devices, including a mobile or stationary subscriber station.

Multiple-access communications systems can employ power control techniques to increase the number of communications devices that can be supported by the system, as well as maintain a desired quality of service. These power control techniques can be applied to communications devices with multiple channels. A multiple channel communications device may be implemented in a variety of fashions and generally includes a traffic channel to transport voice, data and signaling traffic. The communications device may also have any number of non-traffic channels. In these communications devices, the transmission power can be limited to that necessary to achieve a desired quality of service when the traffic channel is active. The traffic channel is active during voice, data or signaling transmissions. A quality parameter of the active traffic channel can be used to dynamically measure the quality of service. When the traffic channel is silent, the transmission power for non-traffic channels can also be controlled to maintain the desired quality of service by using other power control techniques. The traffic channel is silent when the subscriber station is dormant with no voice, data or signaling traffic is being transmitted.

Figure 1:
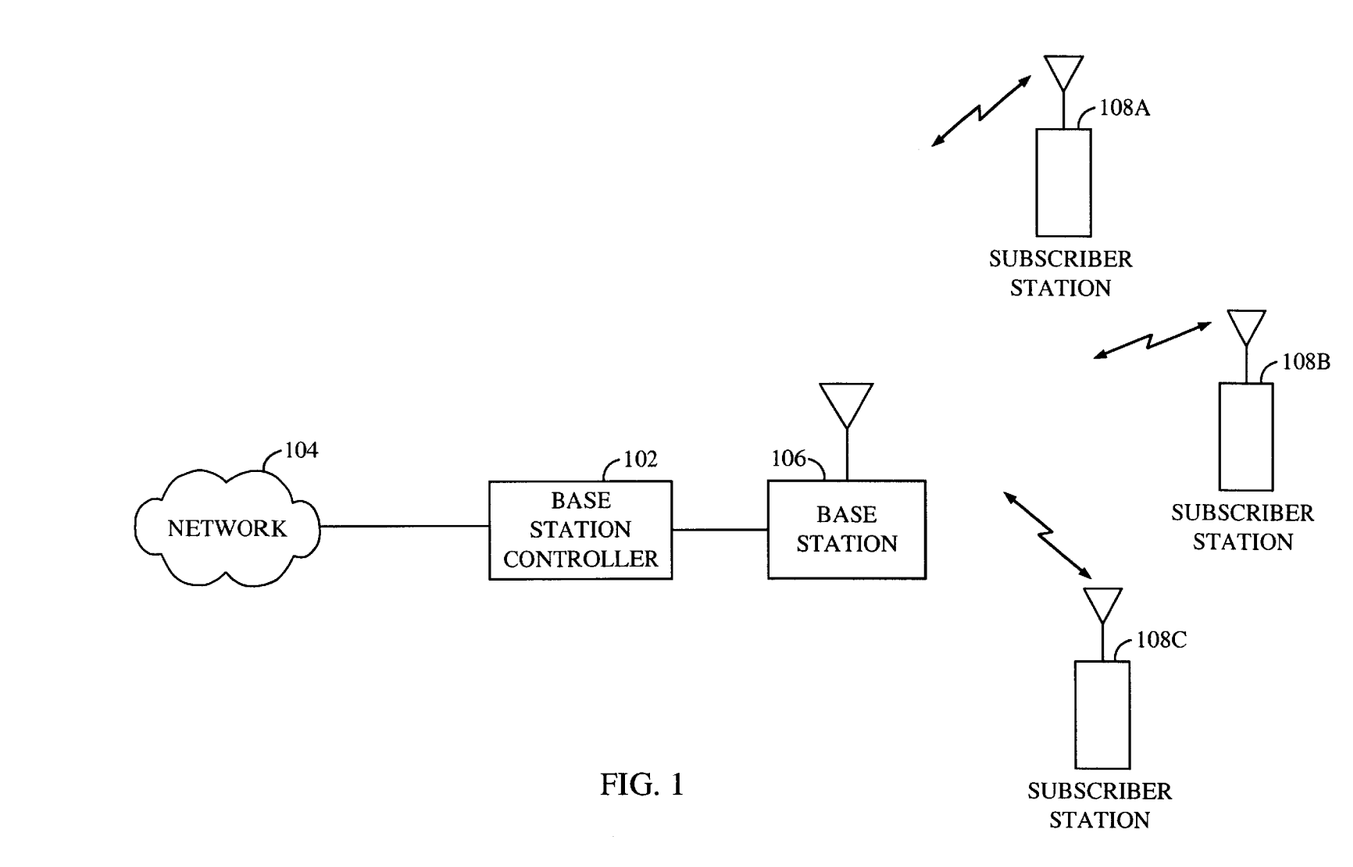
FIG. 1 is a simplified block diagram of an exemplary CDMA communications system.

The application of these power control techniques are further illustrated by reference to FIG. 1. FIG. 1 is a simplified block diagram of an exemplary CDMA communications system. The exemplary CDMA communications system is a modulation and multiple access scheme based on spread-spectrum communications. Although various aspects of the present invention will be described in the context of a CDMA communications system, those skilled in the art will appreciate that the techniques for power control described herein are likewise suitable for use in various other communications environments. Accordingly, any reference to a CDMA communications system is intended only to illustrate the inventive aspects of the present invention, with the understanding that such inventive aspects have a wide range of applications.

Turning to FIG. 1, a base station controller 102 can be used to provide an interface between a network 104 and all base stations dispersed throughout a geographic region. For ease of explanation, only one base station 106 is shown. The geographic region is generally subdivided into smaller regions known as cells. Each base station is configured to serve all subscriber stations in its respective cell. In some high traffic applications, the cell may be divided into sectors with a base station serving each sector. In the described exemplary embodiment, three subscriber stations 108a–c are shown in communication with the base station 106. Each subscriber station 108a–c may access the network, or communicate with other subscriber stations, through one or base stations under control of the base station controller 102. In at least one embodiment, the communications system supports high rate data and high quality voice services over wireless communications channels.

The exemplary communications system supports two-way communications between the base station 106 and the subscriber stations 108a–c. Transmissions from the base station to a subscriber station is referred to as a forward link, and transmissions from a subscriber station to the base station is referred to as a reverse link. The reverse link waveform may take on various forms without departing from the inventive concepts described throughout. By way of example, in some CDMA systems, the reverse link includes a pilot channel and multiple traffic channels to carry voice and data services to the base station. In order to optimize performance over the reverse link, the energy of the pilot channel is balanced with the energy of the traffic channels. Specifically, each channel is first spread with a unique orthogonal code generated by using Walsh functions. A relative Walsh gain is then applied to the traffic channels in order to achieve a desired quality of service. The relative Walsh gain is known as a traffic-pilot ratio (F) and can be defined as follows:

$$F = P_{Traffic}/P_{pilot},$$

where $P_{traffic}$ is the power of a reverse link traffic channel; and $P_{pilot}$ is the power of the reverse link pilot channel.

The Walsh covered pilot and traffic channels are then spread with a long PN code, quadrature modulated with short PN codes, and summed. The resultant waveform can then be modulated onto a carrier waveform, and transmitted to the base station. Other reverse link waveforms will be apparent to those skilled in the art and are equally applicable to the inventive concepts described throughout.

A power control loop can be used to control the power of the reverse link transmission. In the described exemplary embodiment, the power control loop can be used to measure the reverse link transmission power at the base station and provide feedback to the subscriber station to adjust the reverse link transmission power. The feedback signal can be in the form of a power control command which is generated by comparing the measured reverse link transmission power with a power control set point at the base station. If the measured reverse link transmission power is below the set point, then the feedback signal provided to the subscriber station is used to increase the reverse link transmission power. If the measured reverse link transmission power is above the set point, then the feedback signal provided to the subscriber station is used to decrease the reverse link transmission power.

When the traffic channel is active, the set point can be adjusted to maintain a desired quality of service. The quality of service can be determined from any number of quality parameters. These parameters can include the frame error rate (FER) as well as other commonly used quality parameters. In described the exemplary embodiment, the FER of the reverse link transmission is measured at the base station. The measured FER is used to control the power set point. However, when the traffic channel is silent, alternative techniques may be employed to control the set point. The implementation of these alternative techniques may take on various forms depending on the depending on the specific communications system and the overall design constraints. A number of exemplary techniques are described below in the context of a CDMA system, however, those skilled in the art will appreciate that these techniques may be suitable for use in various other communications environments. In addition, other techniques for maintaining a desired quality of service during traffic channel silence may be employed without departing from the inventive concepts described throughout.

One exemplary technique for controlling the set point in the presence of traffic channel silence is particularly applicable to mobile subscriber stations. This technique involves adjusting the set point in the base station as a function of the velocity of the subscriber station. In at least one embodiment, the subscriber stations can be classified into a velocity groups, and an optimal set point can be established for each velocity group during traffic channel silence. Further optimization of the pilot channel power setting may be achieved by taking into account other channel conditions such as multi-path reflections and fading.

Alternative techniques can be used to artificially reduce the power of the reverse link transmission during traffic channel silence. In some CDMA systems, a pilot signal may be transmitted on the pilot channel over the reverse link even when the traffic channel is silent. Since the pilot signal is used for coherent demodulation of the traffic channel, the power of the pilot channel can be substantially reduced when the traffic channel is silent. By substantially reducing the power of the pilot channel during traffic channel silence, mutual interference with other subscriber stations can be minimized. This power reduction in the pilot channel should be done in a way that does not degrade the quality of service when the traffic channel first becomes active.

An exemplary technique for reducing the power of the pilot channel during traffic channel silence is particularly applicable in communications systems where the base station schedules the subscriber station traffic. Since the timing of the reverse link traffic is known, a priori, by the base station, the base station can reduce the set point when the traffic channel is silent, and increase the set point before the end of the silent period in order to give the power control loop adequate time to ramp up the reverse link transmission power before the traffic channel becomes active.

Another exemplary technique for reducing the power of the pilot channel during traffic channel silence involves the manipulation of the traffic-pilot ratio. Specifically, the set point can be reduced when the traffic channel is silent, and the subscriber station can autonomously increase its respective traffic-pilot ratio for a short period of time when the traffic channel first becomes active. The initial increase in the traffic-pilot ratio should maintain the desired quality of service while the power control loop ramps up the reverse link transmission power.

Figure 2:
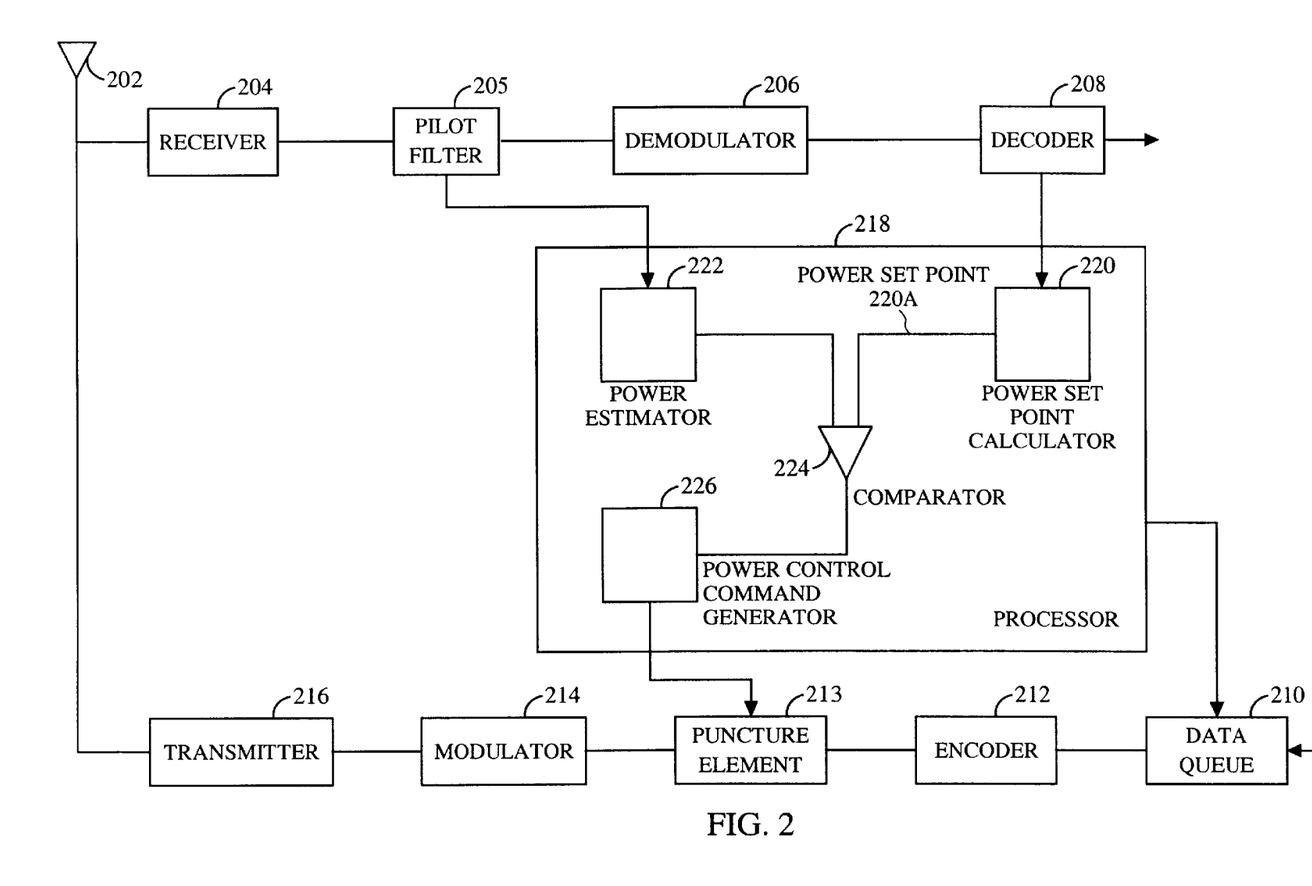
FIG. 2 is a simplified block diagram of a base station adapted for operation in a CDMA communications system.

FIG. 2 is a simplified block diagram of an exemplary base station for generating closed loop power control commands. The exemplary base station includes an antenna 202 which is coupled to a receiving channel and a transmitting channel. The receiving channel includes a receiver 204, a pilot filter 205, a demodulator 206, and a decoder 208. The transmitting channel includes a data queue 210, an encoder 212, a puncturing element 213, a modulator 214 and a transmitter 216. A processor 218 provides an interface between the receiving channel and the transmitting channel.

The receiver 204 is positioned at the front end of the receiving channel and is coupled to the antenna 202. The receiver 204 filters, amplifies, and downconverts the signal received by the antenna 202 to baseband. The baseband signal is provided to the pilot filter 205 which produces a phase reference for coherent demodulation. The baseband signal including the filtered pilot signal is then coupled to a demodulator 206 where it is quadrature demodulated with short PN codes, despread with a long PN code, and decovered with Walsh codes to extract the traffic and pilot channels. The demodulated signal is provided to a decoder 208 which performs the inverse of the signal processing functions done at the subscriber station, specifically the de-interleaving, decoding, and frame check functions.

The frame check functions can be performed in a variety of fashions. By way of example, a cyclic redundancy check (CRC) function can be implemented. In this embodiment, the decoder 208 locally generates a set of CRC bits and compares the locally generated CRC bits with the decoded CRC bits embedded in the received signal. The results of the comparison are provided to the processor 218 indicating whether the decoded frame is corrupted. As those skilled in the art will appreciate, other known frame check functions may be used such as Yamamoto metric, energy detection, and the like to determine whether a decoded frame is corrupted. The precise manner in which this frame check function is implemented is dependent upon the system application, overall design parameters, and other relevant design criteria.

In the described exemplary embodiment, the processor 218 performs several functions which are illustrated in FIG. 2 by a set point calculator 220, a power estimator 222, a comparator 224 and a power control command generator 226. These functions may be implemented directly in hardware, in software executed by the processor, or in a combination of the two. The processor may be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform one or more of the aforesaid functions. As those skilled in the art will appreciate, a separate processor can be used to perform each function, or alternatively, multiple functions can be partitioned among any number of processors.

The set point calculator 222 effectively computes the FER based on the number of properly decoded frames when the traffic channel is active. The computed FER is used to control the set point. In at least one exemplary embodiment, the set point is slightly decreased every time a frame is properly decoded and increased by a relatively large amount every time a corrupted frame is detected. By way of example, the set point calculator 220 can be configured to decrease the set point by 0.01 dB every time a frame is properly decoded and increase the set point by 1 dB every time a corrupted frame is detected to achieve a quality of service of 1%.

The power estimator 222 can be used to compute the reverse link transmission power. In the described exemplary embodiment, the filtered pilot signal from the pilot filter 205 is provided to the power estimator 222. The power estimator 222 computes the reverse link transmission power based on the signal energy of the pilot symbols. The estimated reverse link transmission power is provided to the comparator 224 where it is compared with the set point. The result of the comparison is provided to the power control command generator 226. If the estimated reverse link transmission power is less than the set point, then the power control command generator 226 generates a reverse power control (RPC) bit requesting that the subscriber station increase its reverse link transmission power. Conversely, if the estimated reverse link transmission power is greater than the set point, then the RPC bit is set by the power control command generator 226 to request that the subscriber station reduce its reverse link transmission power.

The data queue 210 in the transmitting channel provides a buffer for traffic from a base station controller (not shown) destined for a subscriber station. The traffic is released from the data queue 210 under the control of the processor 218 and provided to the encoder 212 for encoding, interleaving, and frame check sequence bits. The encoded traffic channel is provided to the puncturing element 213 where the RPC bit is punctured into the traffic channel. The RPC bit is punctured into the traffic channel without coding or interleaving to minimize processing delays. The traffic channel including the RPC bit is provided to the modulator 214 where it is scrambled with a scrambling sequence produced by the long PN code, covered with a Walsh cover, and quadrature modulated with the short PN codes. The quadrature modulated signal is provided to the transmitter 216 where it is upconverted, filtered, and amplified for over the air forward link transmission through the antenna 202.

Figure 3:
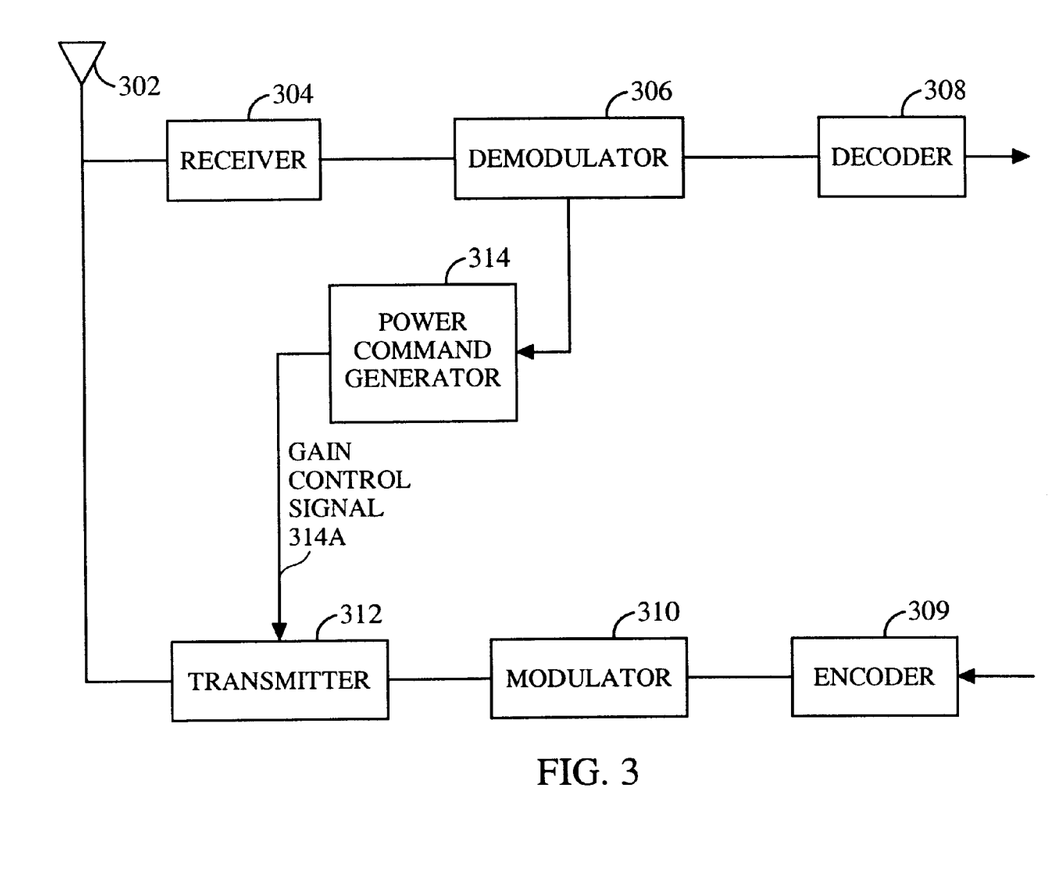
FIG. 3 is a simplified block diagram of a subscriber station adapted for operation in a CDMA communications system.

A simplified block diagram of an exemplary subscriber station is shown in FIG. 3. Similar to the base station, the exemplary subscriber station includes a receiving channel and a transmitting channel both coupled to an antenna 302. The receiving channel includes a receiver 304, a demodulator 306 and a decoder 308. The transmitting channel includes a encoder 309, a modulator 310 and a transmitter 312. A power command generator 314 is used to control the reverse link transmission power as a function of the RPC bit embedded in the received signal.

The receiver 304 is positioned at the front end of the receiving channel and is coupled to the antenna 302. The receiver 304 filters, amplifies, downconverts and digitizes the signal. The digitized signal is coupled to the demodulator 306 where it is quadrature demodulated with the short PN codes, decovered by Walsh codes, and descrambled using the long PN code. The demodulated signal is provided to the decoder 308 which performs the inverse of the signal processing functions done at the base station, specifically the de-interleaving, decoding, and frame check functions.

The demodulator 306 also extracts the RPC bit from the traffic channel and provides it to the power command generator 314. The power command generator 308 generates a gain control signal 314a in response to the extracted RPC bit. The gain control signal is provided to the transmitter modulator 312 to control the power of the reverse link transmission.

Figure 4:
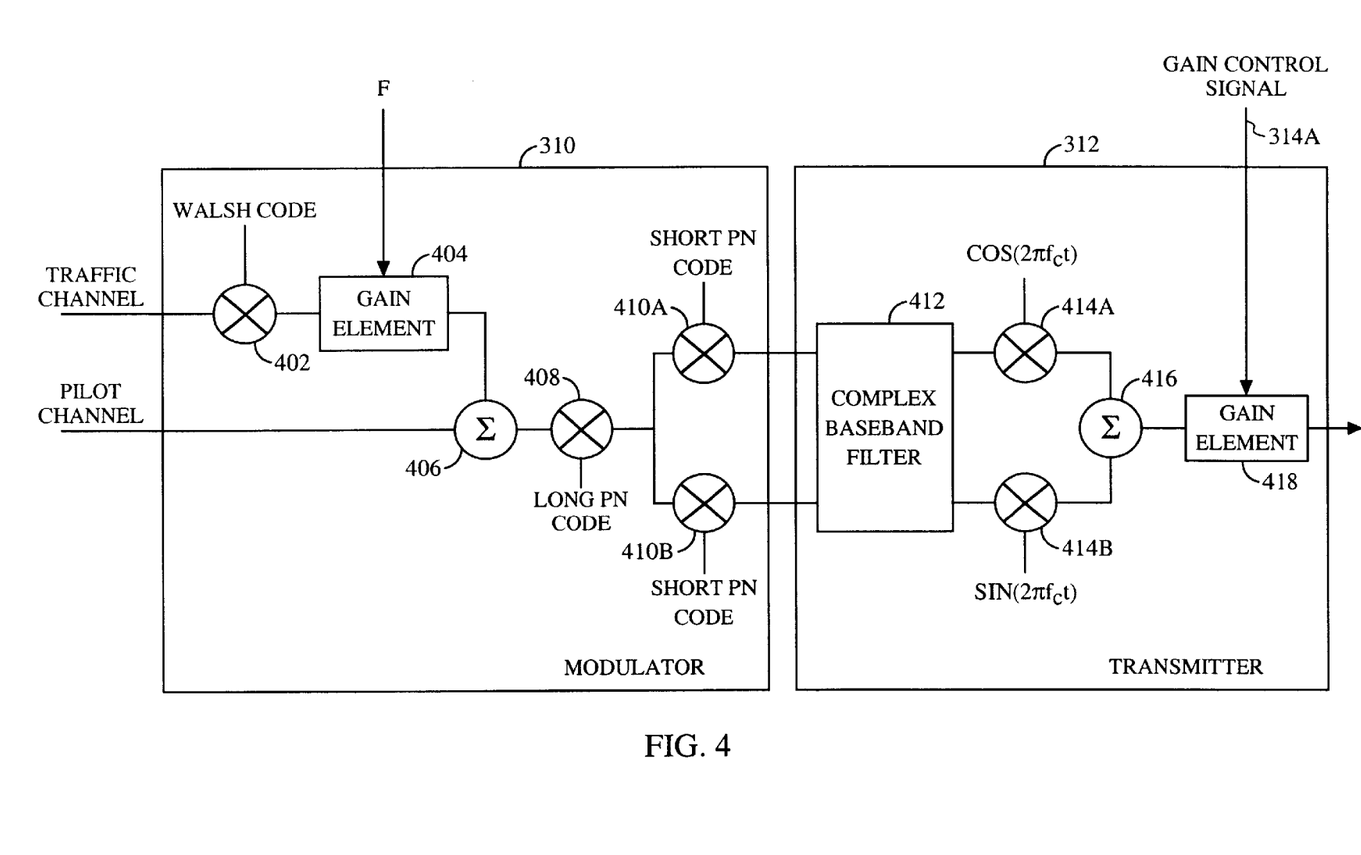
FIG. 4 is simplified block diagram of an exemplary modulator for use in a subscriber station.

A simplified block diagram of an exemplary modulator and transmitter for use in a subscriber station is show in FIG. 4. The traffic channel is interleaved and encoded by the encoder 309 (see FIG. 3) before being coupled to the modulator 310. The modulator 310 includes a mixer 402 for spreading the traffic channel with a Walsh cover. The Walsh covered traffic channel is then provided to a gain element where the relative Walsh gain (F) is applied. The relative Walsh gain is generally set by a processor (not shown) to optimize the traffic-pilot ratio for reverse link transmissions. The traffic-pilot ratio may be a function of a number of parameters such as the carrier frequency, chip rate, data rate, modulation scheme, frame length, and other parameters. The output of the gain element 404 is provided to a summer 406 where it is combined with the pilot channel. The combined traffic and pilot channel are then coupled to a mixer 408 where they are spread using the long PN code. The spread traffic and pilot channels are then split into a complex signal having an in-phase (I) component and a quadrature phase (Q) component. The complex signal is quadrature modulated with the short PN codes by mixers 410a and 410b before being output to the transmitter.

A complex baseband filter 312 is positioned at the input to the transmitter 312 to reject out of band components of the quadrature modulated signal. The filtered complex signal is provided to quadrature mixers 414a and 414b where it is modulated onto a carrier waveform before being combined by a summer 416. The combined signal is then provided to a gain element 418 to control the power of the reverse link transmission through the antenna 302 (see FIG. 3). The gain control signal 314a from the power command generator 314 is used to set the gain of the of the gain element 418.

The power control loop can be implemented in various ways to maintain a desired quality of service when the traffic channel is silent. In communications systems supporting mobile subscriber stations, the velocity of the subscriber station can be used when the traffic channel is silent. This approach is well suited for CDMA applications because a closed loop power control scheme can significantly reduce the required energy to achieve a desired quality of service, particularly at low velocities. Since the energy to achieve a desired quality of service varies significantly across various velocities, the set point can be accordingly reduced for some subscriber stations. Since the base station supports a large number of subscriber stations at any given time, statistically these low energy subscriber stations will contribute to bring down the average reverse link transmission power during traffic channel silence, thereby reducing mutual interference among multiple users.

A number of methods are available for estimating the velocity of the subscriber station. By way of example, a velocity estimation technique base on the characteristics of the pilot channel can be used. A general observation is that during instances of fast fading conditions, the pilot signal power will cross a given power level threshold faster. An envelope level crossing rate (LCR) can be defined as the average number of positive crossings across a predetermined level (R) per second. Referring back to FIG. 2, the pilot signal envelope can be computed by the power estimator 222 in the processor 218. Alternatively, the cumulative RPC bits can be used to extract information on the level crossings, excursion times and depths of the pilot signal power for the purpose of constructing the pilot signal envelope. Regardless of how the pilot signal envelope is computed, the velocity of the subscriber station can be estimated with this technique. It will be understood by those skilled in the art that other velocity estimation techniques may be used without departing from the inventive concepts described throughout. By way of example, the velocity of the subscriber station can be determined through covariance estimation. This technique involves the estimation of autocovariance between faded samples. Alternatively, the velocity of the subscriber station may be estimated through Doppler frequency estimation. The aforementioned techniques are described more fully in U.S. patent application Ser. No. 09/598,526 entitled "Method and Apparatus for Adaptive Power Control in a Wireless Voice and Data Communication System," and assigned to the assignee of the present invention. The contents of this U.S. Patent Application is incorporated herein by reference.

In at least one embodiment, the subscriber station is assigned to one of three velocity groups based on the velocity estimate. The three velocity groups include stationary, low speed, and high speed. The following exemplary algorithm can be applied over 500 frames with the power control loop generating a RPC bit every 1.25 ms:

(1) The subscriber station is classified as a stationary device if the number of positive level crossings exceed 1300 per second, and the maximum excursion time does not exceed the time to generate 50 RPC bits, or 62.5 ms;

(2) The subscriber station is classified as a low speed device if the number of positive level crossings are less than 1200 per second, and the number of times the excursion time exceeds the time to generate 50 RPC bits, or 62.5 ms, is 5 at least per second;

(3) The subscriber station is classified as a high speed device if conditions (1) and (2) are not met.

The processor then adjusts the set point as a function of the velocity group to which the subscriber station is assigned when the traffic channel is silent. The exact setting for the power set point for each velocity group can be determined empirically by techniques well known in the art. This method may be particularly useful when the subscriber station begins autonomous transmissions without notifying the base station that it is about to begin transmission.

The power control loop can also be implemented to artificially reduce the power of the reverse link transmission during traffic channel silence. As explained earlier, this technique is particularly applicable to communications systems in which the traffic between the base station and the subscriber station is scheduled. In these communications systems, the timing of the reverse link is known, a priori. Accordingly, the base station can reduce the power of the pilot channel during periods in which no traffic is scheduled over the reverse link, and ramp up the power of the reverse link transmission prior to the traffic channel becoming active. This power reduction technique can be applied independently of the manner in which the scheduling function is implemented. For ease of explanation, an exemplary embodiment of the base station includes a scheduling function implemented by the processor 218. The scheduling function can be adapted to control both the forward and reverse link transmissions as a function of the available bandwidth and channel conditions. The environmental conditions can be estimated in the processor 218, or other dedicated circuitry, from any number of quality parameters.

The manner in which the scheduling of transmissions occur depends on whether the transmission is over the forward or reverse link. In the case of forward link transmissions, the available bandwidth and estimated channel conditions can be used by the processor 218 to determine when to release traffic from the data queue 210. In the case of reverse link transmissions, the processor 218 can be configured to monitor an access channel for each subscriber station in its respective area of coverage. When a subscriber station is ready to transmit traffic over the reverse link, it sends a request to all base stations that it is in communication with over its access channel. In response to the request from the subscriber station to transmit traffic, the processor 218 assigns a time slot for that subscriber station based on the number of requests received by the base station and the current channel conditions. The base station transmits the assigned time slot to the requesting subscriber station over the paging channel.

When the traffic channel is silent, the set point can be artificially driven to a low level by the set point calculator 220. The set point calculator 220 can then artificially increase the set point prior to the time slot assigned to the subscriber station. The set point should be increased to the optimal reverse link transmission power early enough to allow the power control loop to drive the reverse link transmission power to the optimal value. Once the traffic channel becomes active, the set point can be controlled using the FER.

An alternative power reduction technique involves maintaining the pilot signal power at a low level when the traffic channel is silent, and have the subscriber station autonomously increase its traffic-pilot ratio for a short period of time when the reverse link traffic channel first becomes active. This approach can be implemented in communications systems with or without a scheduling function. In communications systems without a scheduling function, the processor can be adapted to detect when the traffic channel is silent by the absence of decoded frames through methods well known in the art. Once traffic channel silence is detected, the FER estimator 220 can be disabled and the set point can be artificially driven to a low value by the processor 218.

Referring back to FIG. 4, when the subscriber station is ready to transmit traffic over the reverse link, the relative Walsh gain (F) applied to the gain element 404 in the modulator can be increased. The increase in power of the traffic channel should maintain the FER at the desired quality of service while the power control loop ramps up the gain control signal generated by the power command generator 314 (see FIG. 3). The duration of the increased traffic-pilot ratio can be determined empirically to be substantially equal to the time required for the power control loop to stabilize. Alternatively, the increased traffic-pilot ratio duration can be shortened based on system tradeoffs between the desired quality of service and the short term increase in mutual interference among multiple users.

The base station should be configured to compensate for any increase in the traffic-pilot ratio. Specifically, the power control loop should be controlled so that it does not stabilize at a set point that is too low to achieve the desired quality of service once the traffic-pilot ratio is reduced. This can be accomplished in any number of ways. By way of example, the set point can be maintained at a fixed value independent of the FER when the traffic-pilot ratio is increased (see FIG. 2). Once the power control stabilizes, the traffic-pilot ratio can be reduced to its optimal level, and the power control loop based on the FER can take over. Alternatively, the traffic-pilot ratio can be gradually decreased independent of the FER as the set point is ramped up to the optimal value.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Although exemplary embodiments of the present invention has been described, it should not be construed to limit the scope of the appended claims. Those skilled in the art will understand that various modifications may be made to the described embodiments. Moreover, to those skilled in the various arts, the invention itself herein will suggest solutions to other tasks and adaptions for other applications. It is therefore desired that the present embodiments be considered in all respects as illustrative and not restrictive, reference being made to the appended claims rather than the foregoing description to indicate the scope of the invention.

What is claimed is:

1. A method of power control, comprising:
   receiving a transmission having a channel with an active portion, a pilot signal and a silent portion;
   estimating power of the pilot signal; and
   controlling power of the received transmission as a function of the estimated power, and a parameter of the active portion of the channel during a first time period, and
   controlling power of the received transmission independent of the parameter during a second time period.

2. The method of claim 1 wherein the channel comprises a traffic channel.

3. The method of claim 1 wherein the parameter comprises a frame error rate of the active portion of the channel.

4. The method of claim 1, wherein the power control of the received transmission further comprises:
   setting a power control set point as a function of the parameter during the first time period,
   comparing the power control set point with the estimated power, and
   controlling the power of the received transmission as a function of the comparison.

5. The method of claim 4 wherein the power control further comprising increasing the power of the received transmission if the estimated power is below the power control set point and decreasing the power of the received transmission if the estimated power is above the power control set point.

6. The method of claim 4 wherein the parameter comprises a frame error rate of the active portion of the channel, and the setting of the power control set point comprises adjusting the power control set point to achieved a predetermined fixed error rate during the first time period.

7. The method of claim 4 wherein the power control of the received transmission further comprises detecting a transition from the active portion of the channel to the silent portion of the channel, and reducing the power control set point in response to the detected transition.

8. The method of claim 4 wherein the power control of the received transmission further comprises detecting a transition from the silent portion of the channel to the active portion of the channel, and terminating the second time period terminating after the detected transition.

9. The method of claim 4 wherein the power control of the received transmission power comprises controlling the power control set point independent of the parameter during the second time period.

10. The method of claim 9 wherein the power control of the received transmission further comprises estimating a velocity of a source of the received transmission, and controlling the power control set point as a function of the estimated velocity during the second time period.

11. The method of claim 4 wherein the power control of the received transmission further comprises adjusting the power control set point to a first power at the beginning of the silent portion of the channel, and adjusting the power control set point to a second power greater than the first power before the end of the silent portion of the channel.

12. The method of claim 11 further comprising scheduling the active portion of the channel.

13. A method of power control, comprising:
   receiving a transmission having a channel with an active portion and a silent portion;
   adjusting the power of the received transmission to a first power at the beginning of the silent portion of the channel, and adjusting the power of the received transmission to a second power greater than the first power level before the end of the silent portion of the channel; and
   controlling power of the received transmission as a function of a parameter of the active portion of the channel during a first time period and independent of the parameter during a second time period, wherein the first time period corresponds to the active portion of the channel and the second time period corresponds to the silent portion of the channel.

14. The method of claim 13 wherein the power control of the received transmission further comprises estimating a velocity of a source of the received transmission, and controlling the power of the received transmission as a function of the estimated velocity during the second time period.

15. A method of power control, comprising:
   receiving a transmission having a first channel with an active portion and a silent portion, and a second channel;
   controlling power of the received transmission as a function of a parameter of the active portion of the first channel during a first time period and independent of the parameter during a second time period; and setting a power ratio between the channels at the beginning of the active portion of the channel and adjusting the power ratio to a different value before the end of the active portion of the channel.

16. The method of claim 15 wherein the channel comprises a traffic channel and the second channel comprises a pilot channel.

17. The method of claim 16 wherein the adjustment of the power ratio comprises reducing relative power between the traffic channel and the pilot channel.

18. An apparatus configured to receive a transmission having a channel with an active portion and a silent portion, comprising:

a processor configured to:
  estimate a parameter of the active portion of the channel, and power of the received transmission,
  control a power control set point as a function of the estimated parameter during the first time period, and control the power control set point independent of the parameter during the second time period,
  compare the estimated power to the power control set point,
  generate a power command as a function of the estimated parameter during a first time period and independent of the estimated parameter during a second time period, wherein the power command is a function of the comparison,
  detect a transition from the active portion of the channel to the silent portion of the channel, and
  reduce the power control set point in response to the detected transition.

19. The apparatus of claim 18 wherein the channel comprises a traffic channel.

20. The apparatus of claim 18 wherein the parameter comprises a frame error rate of the active portion of the channel.

21. The apparatus of claim 18 wherein the transmission further includes a pilot signal, and the power estimation comprises estimating the power of the pilot signal.

22. The apparatus of claim 18 wherein the power command comprises a power up command if the estimated power is below the power control set point and a power down command if the estimated power is above the power control set point.

23. The apparatus of claim 18 wherein the parameter comprises a frame error rate of the active portion of the channel, and the processor is further configured to adjust the power control set point to achieved a predetermined fixed error rate during the first time period.

24. The apparatus of claim 18, wherein the processor is further configured to estimate velocity of a source of the received transmission, and control the power control set point as a function of the estimated velocity during the second time period.

25. The apparatus of claim 18, wherein the processor is further configured to detect a transition from the silent portion of the channel to the active portion of the channel, the second time period terminating after the detected transition.

26. An apparatus configured to receive a transmission having a channel with an active portion and a silent portion, comprising:

a processor configured to:
  estimate a parameter of the active portion of the channel, and estimate power of the received transmission,
  control a power control set point as a function of the estimated parameter during the first time period, and control the power control set point independent of the parameter during the second time period,
  adjust the power control set point to a first power at the beginning of the silent portion of the channel, and
  adjust the power control set point to a second power greater than the first power before the end of the silent portion of the channel,
  compare the estimated power to the power control set point,
  generate a power command as a function of the estimated parameter during a first time period and independent of the estimated parameter during a second time period, wherein the power command is a function of the comparison.

27. The apparatus of claim 26 wherein the processor is further configured to schedule the active portion of the channel.

28. An apparatus configured to receive a transmission having a channel with an active portion and a silent portion and a pilot signal, comprising:

parameter estimation means for estimating a parameter of the active portion of the channel;

power estimation means for estimating power of the power of the pilot signal;

set point means for setting a power control set point as a function of the estimated parameter during the first time period; and comparison means for comparing the estimated power to the power control set point, the power command being a function of the comparison;

power command generator means for generating a power command as a function of the estimated parameter during a first time period and independent of the estimated parameter during a second time period.

29. The apparatus of claim 28 wherein the channel comprises a traffic channel.

30. The apparatus of claim 28 wherein the parameter comprises a frame error rate of the active portion of the channel.

31. The apparatus of claim 28 wherein the power command comprises a power up command if the estimated power is below the power control set point and a power down command if the estimated power is above the power control set point.

32. The apparatus of claim 28 wherein the parameter comprises a frame error rate of the active portion of the channel, and the set point means comprises means for adjusting the power control set point to achieved a predetermined fixed error rate during the first time period.

33. The apparatus of claim 28 wherein the set means comprises means for controlling the power control set point independent of the parameter during the second time period.

34. The apparatus of claim 33 further comprising velocity estimation means for estimating a velocity of a source of the received transmission, and wherein the set point means comprises means for controlling the power control set point as a function of the estimated velocity during the second time period.

35. The apparatus of claim 33 further comprising means for detecting a transition from the active portion of the channel to the silent portion of the channel, and wherein the set point means comprises means for reducing the power control set point in response to the detected transition.

36. The apparatus of claim 33 further comprising means for detecting a transition from the silent portion of the channel to the active portion of the channel, the second time period terminating after the detected transition from the silent portion to the active portion.

37. The apparatus of claim 33 wherein the set point means comprises means for adjusting the power control set point to a first power at the beginning of the silent portion of the channel, and adjusting the power control set point to a second power greater than the first power before the end of the silent portion of the channel.

38. The apparatus of claim 37 further comprising means for scheduling the active portion of the channel.

39. Computer readable media embodying a method of power control of a received transmission having a channel having an active portion and a silent portion and a pilot signal, the method comprising:
   estimating power of the pilot signal, and
   controlling power of the received transmission as a function of:
      the estimated power, a parameter of the active portion of the channel during a first time period, and independent of the parameter during a second time period.

40. The computer-readable media of claim 39 wherein the power control of the received transmission further comprises setting a power control set point as a function of the parameter during the first time period, comparing the power control set point with the estimated power, and controlling the power of the received transmission as a function of the comparison.

41. The computer-readable media of claim 40 wherein the power control further comprising increasing the power of the received transmission if the estimated power is below the power control set point and decreasing the power of the received transmission if the estimated power is above the power control set point.

42. The computer-readable media of claim 40 wherein the parameter comprises a frame error rate of the active portion of the channel, and the setting of the power control set point comprises adjusting the power control set point to achieved a predetermined fixed error rate during the first time period.

43. The computer-readable media of claim 40 wherein the power control of the received transmission further comprises detecting a transition from the active portion of the channel to the silent portion of the channel, and reducing the power control set point in response to the detected transition.

44. The computer-readable media of claim 40 wherein the power control of the received transmission further comprises detecting a transition from the silent portion of the channel to the active portion of the channel, and terminating the second time period terminating after the detected transition.

45. The computer-readable media of claim 40 wherein the power control of the received transmission power comprises controlling the power control set point independent of the parameter during the second time period.

46. The computer-readable media of claim 45 wherein the power control of the received transmission further comprises estimating a velocity of a source of the received transmission, and controlling the power control set point as a function of the estimated velocity during the second time period.

47. The computer-readable media of claim 40 wherein the power control of the received transmission further comprises adjusting the power control set point to a first power at the beginning of the silent portion of the channel, and adjusting the power control set point to a second power greater than the first power before the end of the silent portion of the channel.

48. The computer-readable media of claim 47 wherein the method further comprises scheduling the active portion of the channel.

49. Computer readable media embodying a method of power control of a received transmission having a channel having an active portion and a silent portion and a pilot signal, the method comprising:
   estimating power of the pilot signal, and
   controlling power of the received transmission as a function of:
      the estimated power, a parameter of the active portion of the channel during a first time period, and independent of the parameter during a second time period
      adjusting the power of the received transmission to a first power at the beginning of the silent portion of the channel, and
      adjusting the power of the received transmission to a second power greater than the first power level before the end of the silent portion of the channel.

50. The computer-readable media of claim 49 wherein the power control of the received transmission further comprises estimating a velocity of a source of the received transmission, and controlling the power of the received transmission as function of the estimated velocity during the second time period.

51. Computer readable media embodying a method of power control of a received transmission having a first channel having an active portion and a silent portion, and a second channel, the method comprising:
   estimating power of the received transmission, and
   controlling power of the received transmission as a function of:
      the estimated power, a parameter of the active portion of the first channel during a first time period, and independent of the parameter during a second time period,
      setting a power ratio between the channels at the beginning of the active portion of the channel and adjusting the power ratio to a different value before the end of the active portion of the channel.

52. The computer-readable media of claim 51 wherein the channel comprises a traffic channel and the second channel comprises a pilot channel, and the adjustment of the power ratio comprises reducing relative power between the traffic channel and the pilot channel.

53. An apparatus, comprising:
   a transmitter configured to transmit first and second channels, the first channel having an active portion and a silent portion; and
   a power control unit configured to maintain a power ratio between the first channel to the second channel during the silent period, adjust the power ratio in response to a transition from the silent portion of the channel to the active portion of the channel, and readjust the power ratio at a predetermined time after the transition.

54. The apparatus of claim 53 wherein the first channel comprises a traffic channel and the second channel comprises a pilot channel.

55. The apparatus of claim 54 wherein the power control unit is further configured to adjust the power ratio in response to the transition such that power of the traffic channel is increased with respect to power of the pilot channel.

56. The apparatus of claim 54 wherein the power control unit is further configured to readjust the power ratio at the predetermined time after the transition such that power of the traffic channel is decreased with respect to power of the pilot channel.

57. The apparatus of claim 54 further comprising a receiver configured to receive a transmission having a power command, and wherein the power control unit is further configured to control the first and second channel transmissions as a function of the power command during the active time period.

58. The apparatus of claim 57 wherein the first channel comprises a traffic channel and the second channel comprises a pilot channel.

59. The apparatus of claim 58 wherein the power control unit is further configured to adjust the power ratio in response to the transition such that power of the traffic channel is increased with respect to power of the pilot channel.

60. The apparatus of claim 58 wherein the power control unit is further configured to readjust the power ratio at the predetermined time after the transition such that power of the traffic channel is decreased with respect to power of the pilot channel.

61. An apparatus, comprising:
   means for transmitting first and second channels, the first channel having an active portion and a silent portion;
   means for maintaining a power ratio between the first channel and the second channel during the silent period;
   adjusting means for adjusting the power ratio in response to a transition from the silent portion of the channel to the active portion of the channel; and
   readjusting means for readjusting the power ratio at a predetermined time after the transition.

62. The apparatus of claim 61 wherein the first channel comprises a traffic channel and the second channel comprises a pilot channel.

63. The apparatus of claim 62 wherein the adjusting means comprises means for increasing power of the traffic channel relative to power of the pilot channel in response to the transition.

64. The apparatus of claim 62 wherein the readjusting means comprises means for decreasing power of the traffic channel relative to power of the pilot channel at the predetermined time after the transition.

65. The apparatus of claim 62 wherein the readjusting means comprises means for decreasing the power of the traffic channel relative to the power of the pilot channel at the predetermined time after the transition.

66. The apparatus of claim 61 further comprising means for receiving a transmission having a power command, and means for controlling power of the first and second channel transmissions as a function of the power command during the active time period.

67. The apparatus of claim 66 wherein the first channel comprises a traffic channel and the second channel comprises a pilot channel.

68. The apparatus of claim 67 wherein the adjusting means comprises means for increasing the power of the traffic channel relative to the power of the pilot channel in response to the transition.

* * * * *